US012625253B2

(12) United States Patent
Sjöland et al.

(10) Patent No.: US 12,625,253 B2
(45) Date of Patent: May 12, 2026

(54) MULTISTATIC RADAR SYSTEM USING WIRELESS COMMUNICATION DEVICES

(71) Applicant: Telefonaktiebolaget LM Ericsson (publ), Stockholm (SE)

(72) Inventors: Henrik Sjöland, Lund (SE); Fredrik Dahlgren, Lund (SE); Ashkan Kalantari, Malmö (SE); Magnus Olsson, Klagshamn (SE); Gang Zou, Lund (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 464 days.

(21) Appl. No.: 18/013,967

(22) PCT Filed: Jul. 10, 2020

(86) PCT No.: PCT/EP2020/069493
§ 371 (c)(1),
(2) Date: Dec. 30, 2022

(87) PCT Pub. No.: WO2022/008064
PCT Pub. Date: Jan. 13, 2022

(65) Prior Publication Data
US 2023/0288554 A1 Sep. 14, 2023

(51) Int. Cl.
*G01S 13/87* (2006.01)
*G01S 7/00* (2006.01)
(Continued)

(52) U.S. Cl.
CPC ............ *G01S 13/878* (2013.01); *G01S 7/003* (2013.01); *G01S 7/023* (2013.01); *G01S 13/42* (2013.01)

(58) Field of Classification Search
CPC ........ G01S 13/878; G01S 7/003; G01S 7/023; G01S 13/42; G01S 13/003; G01S 13/87;
(Continued)

(56) References Cited

U.S. PATENT DOCUMENTS 8,004,454 B2    8/2011  Lindoff et al.
9,930,558 B2    3/2018  Sahin et al.
(Continued)

OTHER PUBLICATIONS

PCT International Search Report, mailed Mar. 30, 2021, in connection with International Application No. PCT/EP2020/069493, all pages.
(Continued)

*Primary Examiner* — Fred A Casca
(74) *Attorney, Agent, or Firm* — Weisberg I.P. Law, P.A.

(57) ABSTRACT

A node in a wireless communication system coordinates multistatic radar measurements, wherein the node controls a plurality of wireless communication devices. Coordination involves obtaining an indication that a first sensing area located within a geographic area that is served by the node is to be sensed by a first radar signal. A first multistatic radar group of wireless communication devices selected from a participating group of the plurality of wireless communication devices and the node is formed, wherein the first multistatic radar group comprises at least one device for transmitting the first radar signal and at least two devices for receiving one or more reflections of the transmitted first radar signal. The first multistatic radar group is controlled to introduce the first radar signal into the first sensing area and to receive the one or more reflections of the introduced first radar signal. The sensed reflections obtained by wireless communication devices in the first multistatic radar group are caused to be combined to obtain geographical information about the first sensing area. Other aspects involve a wireless communication device interacting with a network (Continued)

400

Start

401 — Device sends request to BS to withdraw from radar cooperation

403 — BS removes the device from the radar interest list and if the device is currently assigned to a group, it is un-assigned 405 — If the group is no longer viable, un-assign remaining members and remove group node to receive allocated time and radio frequency resources to be used for a radar function.

33 Claims, 7 Drawing Sheets

(51) Int. Cl.
 *G01S 7/02* (2006.01)
 *G01S 13/42* (2006.01)

(58) Field of Classification Search
 CPC .. G01S 5/02523; G01S 5/02524; G01S 13/86;
 H04B 7/0639; H04B 17/309; H04B
 7/0691; H04B 17/373; H04B 7/0617
 See application file for complete search history.

(56) References Cited

U.S. PATENT DOCUMENTS

| | | | |
|---|---|---|---|
| 9,945,934 | B2 | 4/2018 | Corcos et al. |
| 2017/0328995 | A1 | 11/2017 | Marschalkowski et al. |
| 2018/0348340 | A1* | 12/2018 | Lien ...................... G01S 7/2813 |
| 2019/0293781 | A1 | 9/2019 | Bolin et al. |
| 2020/0003867 | A1 | 1/2020 | Arbabian et al. |
| 2020/0020239 | A1* | 1/2020 | Chen ......................... G08G 5/25 |
| 2020/0187126 | A1 | 6/2020 | Bolin et al. |

OTHER PUBLICATIONS

PCT Written Opinion, mailed Mar. 30, 2021, in connection with International Application No. PCT/EP2020/069493, all pages.
Indian Hearing Notice in Reference of Application No. 202317001443 dated Feb. 25, 2026, consisting of 4 pages.

* cited by examiner

MULTISTATIC RADAR SYSTEM USING WIRELESS COMMUNICATION DEVICES

BACKGROUND

The present invention relates to multistatic radar systems, more particularly to multistatic radar systems using wireless communication devices, and still more particularly to control of wireless communication devices for use as a multistatic radar system.

There is a growing need for applications that run in mobile phones and other types of modem-equipped devices to be aware of objects and events in their surroundings as well as their position. Different sensor options for enabling this awareness include radar and cameras. There is no need to exclude one option in favor of another because information from different sensors can be combined in a process called "sensor fusion" to create a more complete picture. As used herein, the term "radar" refers to a type of sensing in which one or more radiofrequency signals are transmitted (by one or more transmitters) into a sensing environment, and reflections of those signals received (by one or more receivers). An analysis of the received reflection signals provides information about objects that the signals reflected off of in the sensing environment.

Conventional technology has considered providing a mechanism for making mobile communication devices radar-capable. For example, both US Patent Application No. US 20170329449A1 (B. Silverstein and Eden Sherry, "Systems, Methods, and Devices for Utilizing Radar-Based Touch Interfaces", November 2017) and U.S. Pat. No. 8,004,454B2 (M. Lindoff and M. Blomkvist, "Mobile Electronic Device Equipped With Radar", August 2011) describe equipping such devices with a dedicated radar chip so that they can detect objects in the vicinity. But while most mobile phones have a camera, radar sensors are still not widely implemented. One rare exception is the Google Pixel 4 phone, which incorporates a dedicated radar chip to achieve the desired functionality.

The current solution for equipping communication devices with radar capability has only a short range application that requires only low resolution (e.g., gesture recognition and detecting objects in proximity of the device). In addition, the current solutions requiring dedicated radar chips inside the mobile device lead to increased cost and the need provide additional space in the device.

As another solution, U.S. Pat. No. 9,945,934 B2 (D. Corcos and D. Elad, "Radar Integration With Handheld Electronic Devices", April 2018) describes mounting a phased array on the device to add a frequency modulated continuous wave (FMCW) radar. Such a solution is proposed for vehicle communication.

However, integrating long range and high-resolution radar chips inside the mobile phones or mounting a radar enabling mounting case on the device can increase the cost and size of a mobile device substantially. The reason is that the size of an antenna array must be many wavelengths to create a narrow beam for high angular resolution.

There is therefore a need for radar-enabling technology that addresses the above and/or related problems.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

Moreover, reference letters may be provided in some instances (e.g., in the claims and summary) to facilitate identification of various steps and/or elements. However, the use of reference letters is not intended to impute or suggest that the so-referenced steps and/or elements are to be performed or operated in any particular order.

In accordance with one aspect of the present invention, the foregoing and other objects are achieved in technology (e.g., methods, apparatuses, nontransitory computer readable storage media, program means) in which a node in a wireless communication system coordinates multistatic radar measurements, wherein the node controls a plurality of wireless communication devices. Coordination by the node comprises the node obtaining an indication that a first sensing area located within a geographic area that is served by the node is to be sensed by a first radar signal. The node forms a first multistatic radar group of wireless communication devices selected from a participating group of the plurality of wireless communication devices and the node, wherein the first multistatic radar group comprises at least one device for transmitting the first radar signal and at least two devices for receiving one or more reflections of the transmitted first radar signal. The node then controls the first multistatic radar group to introduce the first radar signal into the first sensing area and to receive the one or more reflections of the introduced first radar signal; and causes sensed reflections obtained by wireless communication devices in the first multistatic radar group to be combined to obtain geographical information about the first sensing area.

In an aspect of some embodiments consistent with the invention, forming the first multistatic radar group of wireless communication devices comprises making device selections based on whether a wireless communication device under consideration is capable of performing one or more radar functions.

In an aspect of some embodiments consistent with the invention, forming the first multistatic radar group of wireless communication devices comprises making device selections based on whether a wireless communication device under consideration is being used for other communications.

In an aspect of some embodiments consistent with the invention, forming the first multistatic radar group of wireless communication devices comprises making device selections based on whether a wireless communication device under consideration is located in the first sensing area.

In an aspect of some embodiments consistent with the invention, forming the first multistatic radar group of wireless communication devices comprises making device selections based on whether a wireless communication device under consideration has a line-of-sight channel between the wireless communication device under consideration and one or more other wireless communication devices.

In an aspect of some embodiments consistent with the invention, forming the first multistatic radar group of wireless communication devices comprises making device selections based on whether a wireless communication device under consideration has communicated to the node an indication of availability to perform one or more radar functions.

In an aspect of some embodiments consistent with the invention, forming the first multistatic radar group of wireless communication devices comprises making device selections based on whether transmission of the first radar signal by a wireless communication device under consideration will disturb one or more other communication activities being carried out by one or more of the plurality of wireless communication devices.

In an aspect of some embodiments consistent with the invention, the node obtains information that a member of the first multistatic radar group has changed position, and in response decides whether to remove the member from the first multistatic radar group based on one or more consequences of the changed position of the member of the first multistatic radar group.

In an aspect of some embodiments consistent with the invention, the node assesses whether the first multistatic radar group can continue to perform radar sensing of the first sensing area without participation of the member of the first multistatic radar group that has changed position.

In an aspect of some embodiments consistent with the invention, the node obtains obtaining an indication that a second sensing area located within the geographic area that is served by the node is to be sensed by a second radar signal; and forms a second multistatic radar group of wireless communication devices selected from the participating group of the plurality of wireless communication devices and the node, wherein the second multistatic radar group comprises at least one device for transmitting the second radar signal and at least two devices for receiving one or more reflections of the transmitted second radar signal.

In an aspect of some embodiments consistent with the invention, causing sensed reflections obtained by wireless communication devices in the first multistatic radar group to be combined to obtain geographical information about the first sensing area comprises collecting sensed radar information from members of the first multistatic radar group and supplying the collected sensed radar information to one or more of the wireless communication devices.

In an aspect of some embodiments consistent with the invention, the indication that the first sensing area located within the geographic area that is served by the node is to be sensed by the first radar signal is a request for radar functionality that is received from a requesting one of the wireless communication devices.

In an aspect of some embodiments consistent with the invention, the first multistatic radar group is one of a group of one or more existing multistatic radar groups, and the node receives a second request for radar functionality from a second requesting one of the wireless communication devices; and determines whether the second requesting one of the wireless communication devices is suitable for inclusion in one of the one or more existing multistatic radar groups, and if so then adding the second requesting one of the wireless communication devices to the one of the one or more existing multistatic radar groups.

In an aspect of some embodiments consistent with the invention, if the second requesting one of the wireless communication devices is not suitable for inclusion in one of the one or more existing multistatic radar groups, the node determines whether a new multistatic radar group can be formed to perform the second requested radar functionality and if so, then forming the new multistatic radar group.

In an aspect of some embodiments consistent with the invention, the node responds to the second requesting one of the wireless communication devices not being suitable for inclusion in one of the one or more existing multistatic radar groups and a new multistatic radar group not being able to be formed to perform the second requested radar functionality by adding the second requesting one of the wireless communication devices to a waiting list for future radar functionality servicing.

In an aspect of some embodiments consistent with the invention, the node receives a request from one of the plurality of wireless communication devices to withdraw from the first multistatic radar group, and in response thereto:

removes the requesting one of the plurality of wireless communication devices from the first multistatic radar group; and assesses whether the first multistatic radar group can continue to perform radar sensing of the first sensing area without participation of the one of the wireless communication devices that requested withdrawal from the multistatic radar group.

In an aspect of some embodiments consistent with the invention, a wireless communication device that is served by a network node in a wireless communication system sends a request to the network node for a sensing area located within a geographic area that is served by the network node to be sensed by a radar signal; and receives control information from the network node in response to the request, wherein the control information indicates that the wireless communication device is to perform one or both of:

transmitting the radar signal into the sensing area; and receiving a reflected radar signal from the sensing area, wherein the control information specifies what time and frequency resources are to be used for one or both of the transmitting and the receiving.

In an aspect of some embodiments consistent with the invention, the wireless communication device selects a transmit beam to be used when transmitting the radar signal.

In an aspect of some embodiments consistent with the invention, the wireless communication device selects a receive beam to be used when receiving the reflected radar signal from the sensing area.

BRIEF DESCRIPTION OF THE DRAWINGS

The objects and advantages of the invention will be understood by reading the following detailed description in conjunction with the drawings in which.

DETAILED DESCRIPTION

Figure 1:
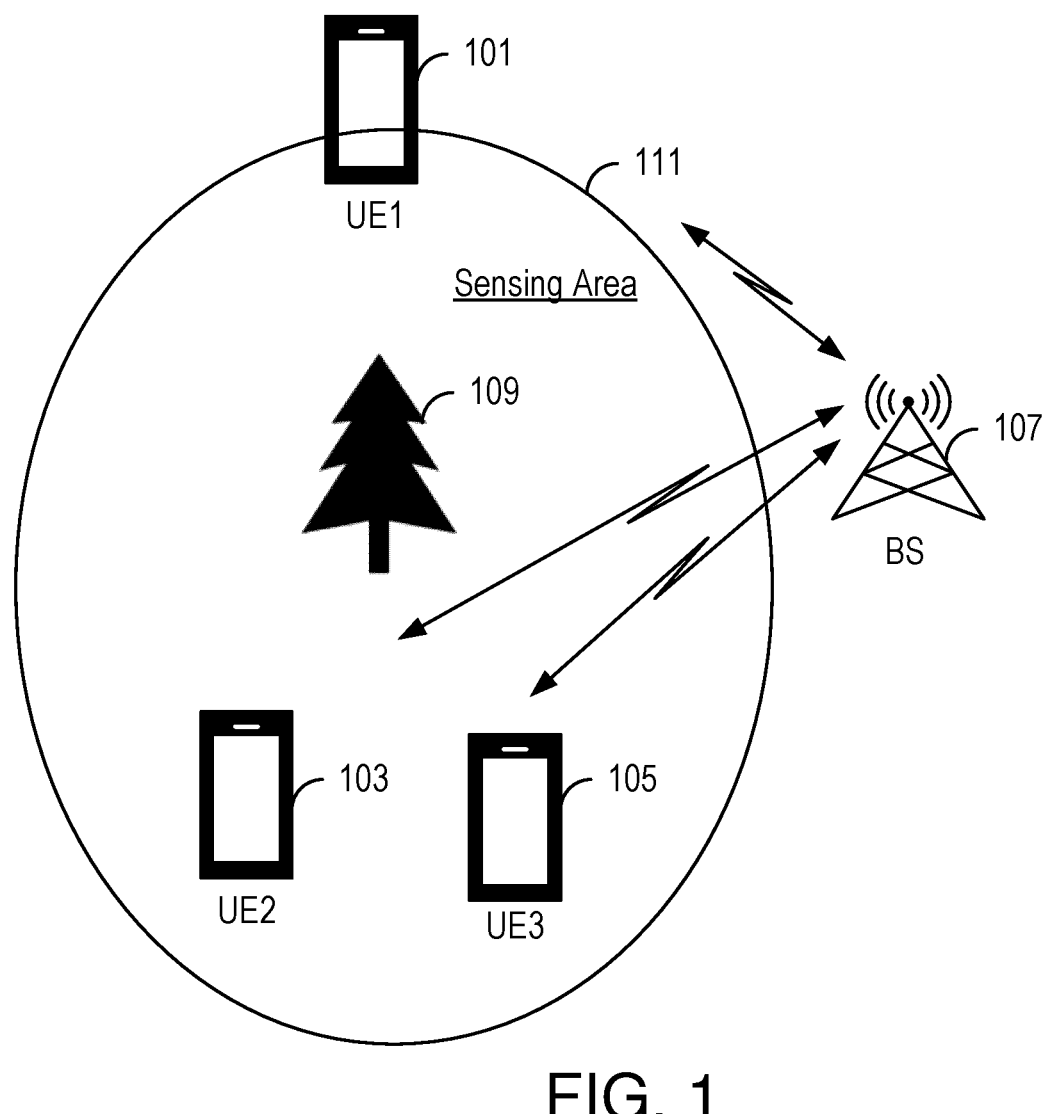
FIG. 1 illustrates a scenario in which first, second, and third User Equipments (UEs) are all served by a base station, and in which a tree is located within a sensing area that is in the vicinity of the three UEs.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits alone, one or more programmed processors, or any combination of these). Moreover, the invention can additionally be considered to be embodied entirely within any form of nontransitory computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

An aspect of embodiments consistent with the invention involves adding radar functionality to mmWave communication devices such as, but not limited to, 5G or WiGig phones, which have a beamforming mmWave communication transceiver. Only a minimum of additional hardware is required to adapt the beamforming mmWave communication transceiver to provide radar sensing capabilities. The mmWave transceiver can be used as a monostatic radar (i.e., a radar mode in which the same device both transmits a radar signal and receives reflections of that transmitted signal) if it can receive and transmit signals simultaneously. This can be achieved in different ways. One is to modify the antenna switches of the device to simultaneously connect the receiver and transmitter chains to the antenna elements. Another is to use one part of the antenna array for transmitting the radar signal and another part for receiving the reflections of that signal. In either case, radar range will be compromised because the transmit power and/or the antenna gain will be reduced by the duplexing. Furthermore, in general, the antenna array in a mobile device is rather small with only a limited number of antenna elements. This limited number limits the sharpness of the antenna beam, and hence the angular resolution. As a result, the angular resolution of the monostatic radar will also be limited.

In accordance with aspects of embodiments consistent with the invention, these characteristics can be improved upon by configuring a device to cooperate with other nearby devices or base stations to form a bistatic (one device transmitting a radar signal coupled with another device that receives the radar reflections) or multistatic (at least two transmitting devices coupled with at least one receiving device, or at least one transmitting device coupled with at least two receiving devices) radar system. And still further, a monostatic radar image obtained by one device can be combined with one or more images sensed by other devices that are cooperating in a multistatic radar arrangement. By doing this, the radar system can detect objects hidden by shadowing of the monostatic radar, and the combination of monostatic and multistatic images provides the most information. The multistatic operation can also provide longer range because the receiver and transmitter are isolated by being part of different devices. Due to the distance between the transmitter and receiver, the radar transmitter power does not have to be reduced to protect the receiver. Moreover, the full antenna array can be used by one device for transmission and by another device for reception. Furthermore, a radar feedback loop can be set between the receiving device(s) and the transmitting device(s) by using a communication link, such as 3GPP cellular, Wi-Fi, and the like. This communication link allows the transmitter(s) to adapt the waveform of its radar signal, (e.g. frequency bandwidth, time duration, amplitude, etc.) according to the feedback from the receiver(s). This would further improve the performance of the radar system, for example in an object tracking scenario.

Another aspect of embodiments consistent with the invention relates to coordination of communication devices to form multistatic radar groups. In some but not necessarily all embodiments, a device in need of radar functionality transmits a request to the base station. The request should contain the needs as well as the capabilities of the device. The base station will then determine if the requesting device can be made part of a group, or whether it should alternatively be placed on a waiting list until proper conditions are met. While on the waiting list for a group, the base station can grant rights to perform monostatic radar measurements.

A device requesting and/or engaging in radar functionality can have different capabilities in terms of radio frequency bandwidth, beamforming, number of antenna panels, directions of antenna panels, array size of antenna panels, and battery power available for radar operation, and may thus be requested to participate in different ways with respect to both transmission and reception. It may also have different needs for data, for example with respect to required level of accuracy, type of data, and update frequency. The base station balances the needs and capabilities of the devices in the system. The operation may also be dynamic, so that if significant movements of users or objects are detected, the measurements are performed more frequently.

In another aspect, if a device no longer wants to participate in a group, it sends a request to the base station to exit. If a device moves to a new cell, it may transmit a radar request and its capabilities to the new serving base station, in response to which the new serving base station should try to find a new multistatic group in its cell for the device to join. If that is not possible, the device can be placed on a waiting list for a new group.

It is also possible that a device may remain within a same cell and yet move out of the region of interest for the multistatic group, so it can no longer participate in the cooperation. In such instances, the base station should assign the device to a new group or, if that is not possible, place the device on a waiting list for a new multistatic group.

It is important to have accurate ranging information in order to determine the positions of objects. To achieve this in a multistatic measurement, the radar signals should contain time information, implicit or explicit, and measurements between two participating devices to be ranged should be taken in both directions, so that the first device receives and the other transmits, and then the other way around. If there is line-of-sight signal propagation between a two devices, an accurate distance can be calculated. To determine whether there are line-of-sight conditions, several properties can be checked. One of these is signal strength, which can be checked to see if it is within an expected interval for the estimated range. Second, a check can be performed to determine whether the first channel impulse response tap is the strongest. A measure of the quality of the line-of-sight condition can be calculated based on the signal strength compared to the expected, and how much stronger the first peak of the channel impulse response is compared to the rest. This quality or confidence parameter should be part of the calculation of the positions of all devices, together with the ranges and angles.

A more full discussion is presented below to highlight further aspects of the technology. The discussion begins with an introduction of terms and expressions used herein.

The term "monostatic radar" is used to refer to radar functionality in which the transmitter and receiver are collocated in a same radar device.

The term "bistatic radar" refers to a radar system comprising a transmitter and receiver that are separated by some distance, typically comparable to the expected target distance. In bistatic radar, the reflected radar signal is still sensed at only one location.

The term "multistatic radar" refers generally to a radar system containing multiple spatially diverse monostatic radar and/or bistatic radar components applied over a shared area of coverage. Multistatic radar can contain one or more receivers processing reflected signals from one or more geographically separated transmitters. For example, the radar system may include one receiver and multiple transmitters, or multiple receivers and one transmitter, or multiple receivers and multiple transmitters. It will be observed, however, that if there are only two devices, one operating as a radar transmitter and the other operating as a radar reflection receiver, the multistatic radar devolves into the bistatic case.

As mentioned earlier, it is possible to configure a single mmW communication transceiver to perform in a monostatic radar configuration. In particular, monostatic radar operation can be supported by modifying the antenna switch of a mmWave communication transceiver (for example, a 5G mmWave transceiver or a WiGig mmWave transceiver) to simultaneously connect the receiver and transmitter to the antenna. There is also a need for transmit signal cancellation in the receiver, similar to that in full-duplex communication, adding complexity to the solution. Alternatively, part of the antenna array can be used for receiving and another part for transmitting, but then angular resolution is degraded due to the smaller effective receive and transmit arrays.

Because of the drawbacks associated with monostatic operation, the technology described herein is designed to instead enable mmWave communication devices to be coordinated to perform multistatic radar operation. Multistatic operation requires no modification to the antenna switch or to the antenna array, and the full antenna array can be used in both receive and transmit operation.

In addition to being easier to implement in a wireless communication system, multistatic operation can also provide information that is not possible to obtain with monostatic radar. As an example, consider the simplified scenario in FIG. 1, in which first, second, and third User Equipments (UEs) 101, 103, 105 are all served by a base station 107. A tree 109 is located within a sensing area 111 that is in the vicinity of the three UEs 101, 103, 105.

As will be described further below, the base station 107 can form a multistatic radar group comprising the three UEs 101, 103, 105 (assuming the UEs are each capable of performing at least one of radar signal transmission and radar reflection signal reception), and with this group the tree 109 can be radar illuminated by any one or more of the first, second, and third UEs 101, 103, 105, as well as by the BS 107 if it is also radar capable and can participate in the multistatic radar group. Those devices that are not transmitting a radar signal are receiving radar reflection signals. If for instance the first UE 101 is transmitting and the second and third UEs 103, 105 are receiving, it is possible to obtain a radar image of the tree being illuminated from the back. This is not possible with monostatic radar because in that case the illumination will always be from the front (i.e., the same side of the object that the receiver is facing). The radar image obtained from multistatic operation can reveal interesting information, like the absorption properties of an object. Also, receiving the reflection signal at the BS 107 for the same illumination from the first UE 101 will tell how much of the radiation is leaving the tree at an approximately 90 degree change of direction, which also depends on, and therefore provides information about, the internal structure of the object (e.g., the tree 109).

In another possibility, transmitting with the second UE 103 and receiving with the third UE 105 will give nearly monostatic information in this case, but with much higher performance than if trying to perform a monostatic measurement with a single UE using a slightly modified modem to support radar functionality. As can be understood, combining all the multistatic information will provide good opportunities for correct classification of objects.

To correctly interpret and combine the multistatic radar information it is necessary to know the relative positions of the participating units. It is assumed that the location of the base station 107 is known, and its beam directions are also known. Through bidirectional time delay measurements the distances between pairs of units can be measured, if line-of-sight transmissions between them are possible. In one possibility, the transmissions in both directions contain a time stamp marking the transmission time of the local clock, from which the local clock difference can be calculated, as well as the distance between the two units. Alternatively, the transmissions can be made to occur at mutually agreed upon local clock times. The direction (angle of arrival and angle of departure) is also a key factor in producing a three-dimensional map of all participating device locations. It is not necessary to have line-of-sight between all devices. For instance, in the example of FIG. 1 the first UE 101 lacks line-of-sight to both the second and third UEs 103, 105. Its position will then be determined using its angle and distance to the base-station. The position accuracy will, however, increase the more line-of-sight connections are available, and each participating unit must be linked to the base-station by at least one chain of line-of-sight connections, where a chain can contain one or more other units or can be the unit's own direct connection.

Knowing the distance and direction to the transmitter, when the receiver receives the reflection from objects with different time delays compared to the line-of-sight signal and from different directions, it is possible to calculate the position of the object. This follows from geometry, where the signal propagates along the sides of a triangle, with the receiver, transmitter, and the object being the three corners of the triangle. To find the time difference from the line-of-sight component, it can be received by a side lobe, which is facilitated by the strong signal level of the direct path. More particularly, the timing of all received echoes is measured in relation to the shortest (line of sight) path, and since the line of sight path is so strong it can be picked up with a sidelobe. The main lobe should be used for the reflection that is to be measured in order to get the best possible signal strength for that, as wells as a measure of the direction. Some sidelobe will then point in the direction of the line-of-sight (LOS) beam and pick that up. This has the advantage of eliminating any need to change beam direction in-between receiving the two signals, which would have been difficult (or impossible) because they most likely overlap in time.

In other aspects of embodiments consistent with the invention, there can be one or several multistatic radar groups in an area. A group can contain at least one base station and one or several mobile devices or UEs. The base station may, but is not required to, participate in multistatic radar transmission or reception; its presence is required at least for coordination of group operations. Each group is coordinated by a designated base station, and one base station might participate in more than one such group. The formation of a group is dynamic and depends on which UEs are in the area, their relative positions, their needs for radar information as well as their indicated properties and status, and the like. Depending on these factors, the coordinating base station decides which devices will be participants in a group. The properties of a participant from this perspective can include, but are not limited to, its supported radar functionality (e.g., frequencies, antenna and beam forming capabilities, output power, algorithmic support, etc.), and its status can include, but is not limited to, its position, its battery charge, the criticality of its current operations, and the like.

To further illustrate aspects of embodiments consistent with the invention, actions relating to group dynamics will now be described. In addition to the list of members for all different multistatic radar groups, the base station keeps a list of all devices in its cell that are interested in radar cooperation. That list contains updated information about each device's capabilities and needs, and that list is the basis for forming the multistatic radar cooperation groups.

Figures 2, 3, 4:
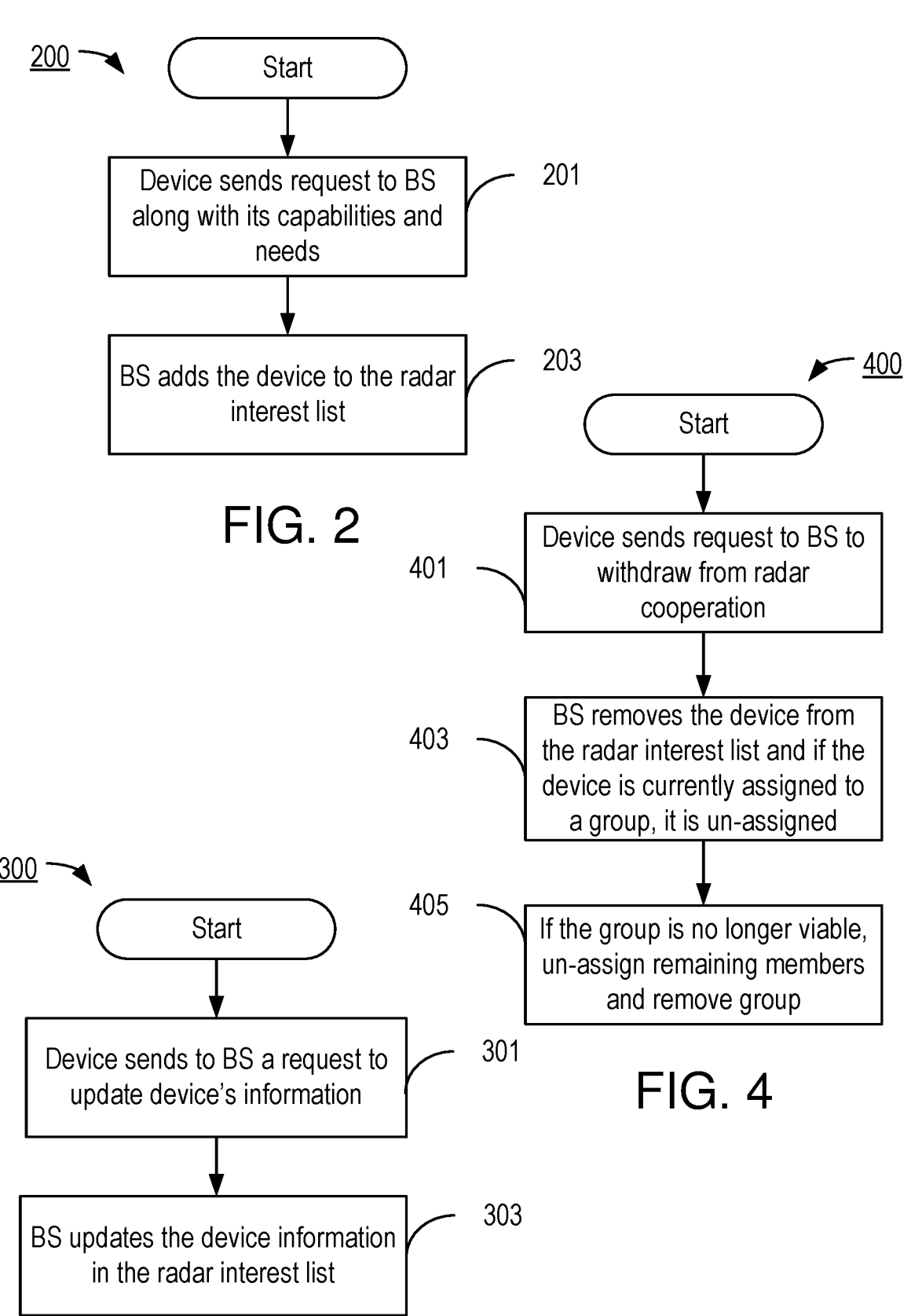
FIG. 2 is, in one respect, a flowchart of actions in accordance with exemplary embodiments corresponding to initial signaling between a communication device (e.g., UE) and its serving node (e.g., base station) about the device's radar functionality and radar requirements.
FIG. 3 is, in one respect, a flowchart of actions in accordance with exemplary embodiments corresponding to a communication device (e.g., UE) informing its serving node (e.g., base station) about the device's changed status.
FIG. 4 is, in one respect, a flowchart of actions in accordance with exemplary embodiments corresponding to a communication device (e.g., UE) informing its serving node (e.g., base station) about the device's request to withdraw from multistatic radar participation.

Referring first to FIG. 2, this is, in one respect, a flowchart of actions in accordance with exemplary embodiments corresponding to initial signaling between a communication device (e.g., UE) and its serving node (e.g., base station) about the device's radar functionality and radar requirements. In another respect, the blocks depicted in FIG. 2 can also be considered to represent means 200 (e.g., hardwired or programmable circuitry or other processing means) for carrying out the described actions.

The illustrated actions begin with the communication device sending a request for radar functionality to the node (step 201). The request may constitute an indication that a first sensing area located within the geographic area that is served by the node is to be sensed by a radar signal. The request can alternatively or in addition indicate other things as well, such as the device's radar capabilities and needs.

Upon receiving the request from the communication device, the node adds the requesting device to a radar interest list (step 203).

After it has been placed in a radar interest list, the communication device may have a change of status with respect to any aspect of its previously indicated capabilities and needs. To handle this situation, actions indicated in FIG. 3 may be performed in some embodiments. FIG. 3 is, in one respect, a flowchart of actions in accordance with exemplary embodiments corresponding to a communication device (e.g., UE) informing its serving node (e.g., base station) about the device's changed status. In another respect, the blocks depicted in FIG. 3 can also be considered to represent means 300 (e.g., hardwired or programmable circuitry or other processing means) for carrying out the described actions.

The illustrated actions begin with the communication device sending to its serving node a request to update the device's information (step 301).

Upon receiving the request from the communication device, the node updates the requesting device's information in the radar interest list (step 303).

In another aspect of embodiments consistent with the invention, a communication device may need to withdraw from participation in a multistatic radar group or have itself removed from consideration for such a group if it is not already in one. To handle this situation, actions indicated in FIG. 4 may be performed in some embodiments. FIG. 4 is, in one respect, a flowchart of actions in accordance with exemplary embodiments corresponding to a communication device (e.g., UE) informing its serving node (e.g., base station) about the device's request to withdraw from multistatic radar participation. In another respect, the blocks depicted in FIG. 4 can also be considered to represent means 400 (e.g., hardwired or programmable circuitry or other processing means) for carrying out the described actions.

The illustrated actions begin with the communication device sending to its serving node a request to withdraw from radar cooperation (step 401).

Upon receiving the request from the communication device, the node (e.g., base station) removes the device from the radar interest list, and if the device is currently assigned to a multistatic radar group, it is un-assigned (step 403).

If the communication device has been removed from a multistatic radar group, the node determines whether the group is still viable (e.g., determining whether it still has sufficient members to perform multistatic radar operations, that is transmitting a radar signal by one or more members and receiving reflections of the transmitted radar signal by at least two members). If the node determines that the group is no longer viable, the remaining members of the group are unassigned from that group and the group's existence is removed from the node's internal record-keeping (step 405).

Figure 5A:
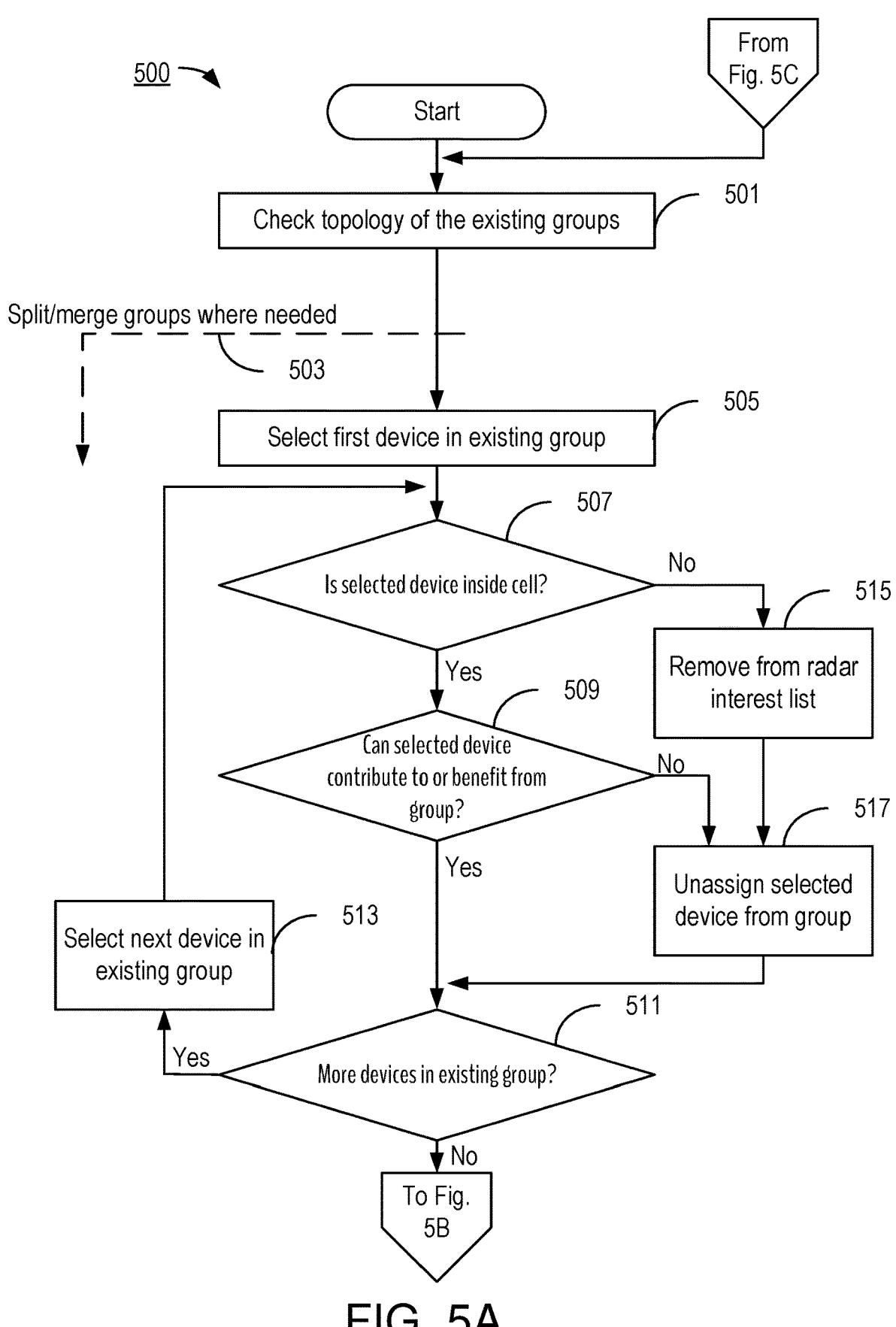
FIGS. 5A, 5B, and 5C together, in one respect, constitute a flowchart of actions in accordance with exemplary embodiments corresponding to a network node that controls multistatic radar operation with respect to a sensing area lying within the cell that the node serves.
Figure 5B:
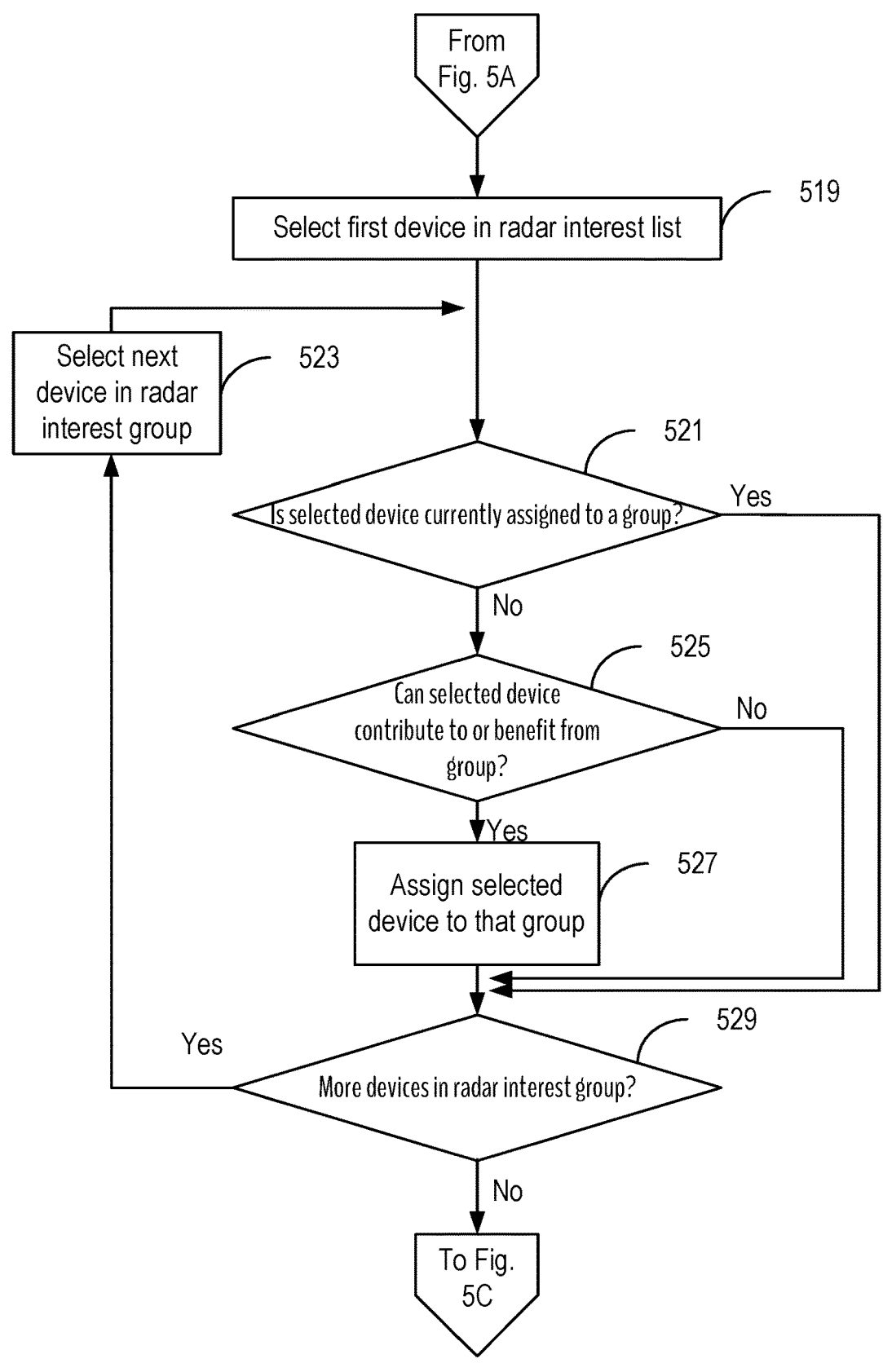
Figure 5C:
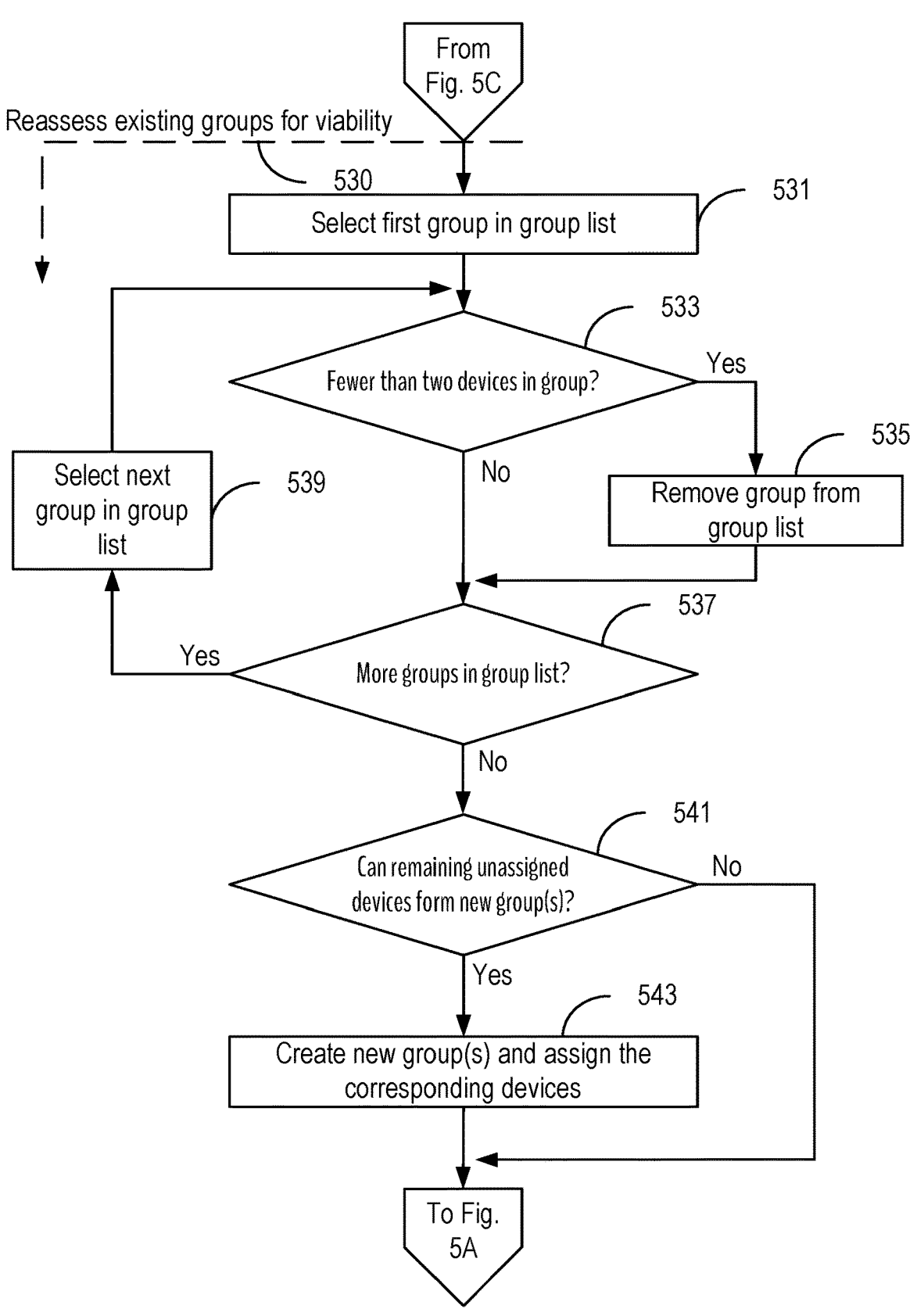

The discussion will now focus on actions taken by a network node (e.g., a base station 107) to coordinate and in other respects support multistatic radar functionality performed by communication devices (e.g., the first, second, and third UEs 101, 103, 105) that it serves. Reference therefore is now made to FIGS. 5A, 5B, and 5C which together, in one respect, constitute a flowchart of actions in accordance with exemplary embodiments corresponding to a network node 107 that controls multistatic radar operation with respect to a sensing area 111 lying within the cell that the node 107 serves. In another respect, the blocks depicted in FIGS. 5A through 5C can also be considered to represent means 500 (e.g., hardwired or programmable circuitry or other processing means) for carrying out the described actions.

The first discussed action is the network node 107 checking the topology of any existing multistatic radar groups that may have already been set up (step 501). The reference to pre-existing multistatic radar groups is in recognition that in this embodiment, the set of actions repeat periodically, so the indicated "start" of operation may not actually be the first pass through the loop.

The existing topology is checked against the radar requirements of the application for which radar sensing is to be performed. This checking can include, without limitation:

1. Radar coverage in certain areas
2. Whether there is a need for a more accurate analysis of some specific geographical areas than was previously obtained
3. Whether there are enough participating devices in each group to adequately sense the application target.

Different characteristics of the participating devices such as position, presence or absence of LOS orientation with respect to other devices or a radar target, closeness or farness with respect to the intended sensing area, other ongoing activities that a device might be engaged in (e.g., high-bitrate critical data transfer or if presently idle), battery level, beam strength, signal processing capabilities, and the like. These characteristics can be considered when checking the topology.

Based on the topology check, the node splits and/or merges multistatic radar groups as needed (503). More particularly, the groups can be re-defined in dependence on the findings of the topology check. An overview of the process includes assessing whether a device can contribute to or benefit from a radar group. Depending on the outcome, the devices are assigned to or unassigned from the available groups. This includes devices that are already in a group as well as unassigned devices that are on the radar interest list. If a device has left the cell/area, it will be unassigned.

On the other hand, depending on the radar application requirement in different groups, devices might be reassigned to a different group or the groups might be merged for better performance metrics such as better cover of a certain area.

Looking at this in greater detail, assuming that there are one or more existing multistatic radar groups (the steps involving existing groups can be skipped over if not), a first device is selected from an existing group (step 505). A check is performed to determine if the selected device is still inside the cell (decision block 507). If not (e.g., if the device has moved or been turned off), ("No" path out of decision block 507), the device is removed from the radar interest list (step 515) and is also unassigned from the multistatic radar group presently under consideration (step 517). A check is then performed to determine whether there are more devices to be considered in the existing group (decision block 511). If so ("Yes" path out of decision block 511), then a next device is selected from the existing group (step 513) and processing reverts back to decision block 507.

If, at decision block 507, it is determined that the selected device is still inside the cell ("Yes" path out of decision block 507), then it is determined whether the selected device can still contribute to, or benefit from (or both), inclusion in the group (decision block 509). If not ("No" path out of decision block 509), then it is unassigned from the group (step 517) and processing continues to decision block 511 which operates as described above.

Returning to consideration of decision block 509, if the selected device can still contribute to, or benefit from (or both), inclusion in the group ("Yes" path out of decision block 509), then processing continues to decision block 511 which operates as described above.

At some point, all of the devices in the existing group will have been considered ("No" path out of decision block 511), at which point a first device is selected from the radar interest list (step 519), which as described earlier, is a list of devices that includes those that have indicated an ability to perform one or more radar functions, and/or a request for radar services (e.g., to have a sensing area scanned). The selected device is checked to determine whether it is currently assigned to a multistatic radar group (decision block 521). If so ("Yes" path out of decision block 521), then the radar interest group is checked to see if there are more listed devices to consider (decision block 529). If so ("Yes" path out of decision block 529), then a next device is selected from the radar interest group (step 523) and processing reverts back to decision block 521.

If there are not any more listed devices to consider from the radar interest group ("No" path out of decision block 529), then processing continues at step 535, discussed below.

But still focusing on decision block 521, if the selected device is not currently assigned to a multistatic radar group ("No" path out of decision block 521), then it is determined whether the selected device can contribute to, or benefit from (or both), inclusion in a group (decision block 525). If not ("No" path out of decision block 525), then the radar interest group is checked to see if there are more listed devices to consider (decision block 529). If so ("Yes" path out of decision block 529), then a next device is selected from the radar interest group (step 523) and processing reverts back to decision block 521.

If there are not any more listed devices to consider from the radar interest group ("No" path out of decision block 529), then processing continues at step 535, discussed below.

But still focusing on decision block 525, if the selected device can contribute to, or benefit from (or both), inclusion in a group ("Yes" path out of decision block 525) then the selected device is assigned to the group to which it can contribute or from which it can benefit (step 527).

The radar interest group is checked to see if there are more listed devices to consider (decision block 529). If so ("Yes" path out of decision block 529), then a next device is selected from the radar interest group (step 523) and processing reverts back to decision block 521.

If there are not any more listed devices to consider from the radar interest group ("No" path out of decision block 529), then the existing groups need to be reevaluated in view of devices that may have been removed from groups (see step 535) in order to determine whether the remaining devices in a group can continue to perform radar sensing of their assigned sensing area without participation of the one or more wireless communication devices that have been removed from the group (530). This involves selecting a first group from a list of all existing multistatic radar groups (step 531).

It is checked to determine if there are fewer than two devices (including the node 107 itself if it had been a participant in the group) remaining in the selected group that can operate in a multistatic radar configuration (decision block 533). If so ("Yes" path out of decision block 533), then the group in its entirety is removed from the group list (step 535) because these are no longer a multistatic group per definition. The devices might still benefit from monostatic or bistatic radar operation, but that is beyond the scope of this discussion. Processing then continues to decision block 537 to determine if there are more groups in the list of multistatic radar groups (decision block 537). If so ("Yes" path out of decision block 57), then a next group is selected from the list (step 539) and processing reverts to decision block 533.

At decision block 533, if there are still more than two devices remaining in the group that can operate in a multistatic radar configuration ("No" path out of decision block 533) then processing continues directly to decision block 537 which functions as described above. As mentioned earlier, multistatic radar operation can proceed if there are at least multiple transmitters or at least multiple radar receivers. Further the node (base station 107) can serve one or both of these roles, as appropriate.

At some point, there are no more remaining groups in the multistatic radar group list to assess ("No" path out of decision block 537) and an assessment is made to determine whether remaining unassigned communication devices (from the radar interest list) are suitable to operate together as a new multistatic radar group (decision block 541). If so ("Yes" path out of decision block 541), then one or more new multistatic radar groups are formed as appropriate from the identified devices (step 543) and processing reverts back to step 501 where processing repeats as described above. The steps of determining whether remaining unassigned communication devices are suitable to operate together as a new multistatic radar group and then forming groups as appropriate is especially useful if the radar application requirements have not yet been fulfilled. These actions create the possibility of still fulfilling the radar application requirements by forming one or more new multistatic radar groups.

If remaining unassigned communication devices (from the radar interest list) are not suitable to operate together as a new multistatic radar group ("No" path out of decision block 541), then no new groups are formed and processing continues directly to step 501 where processing repeats as described above.

Figure 6:
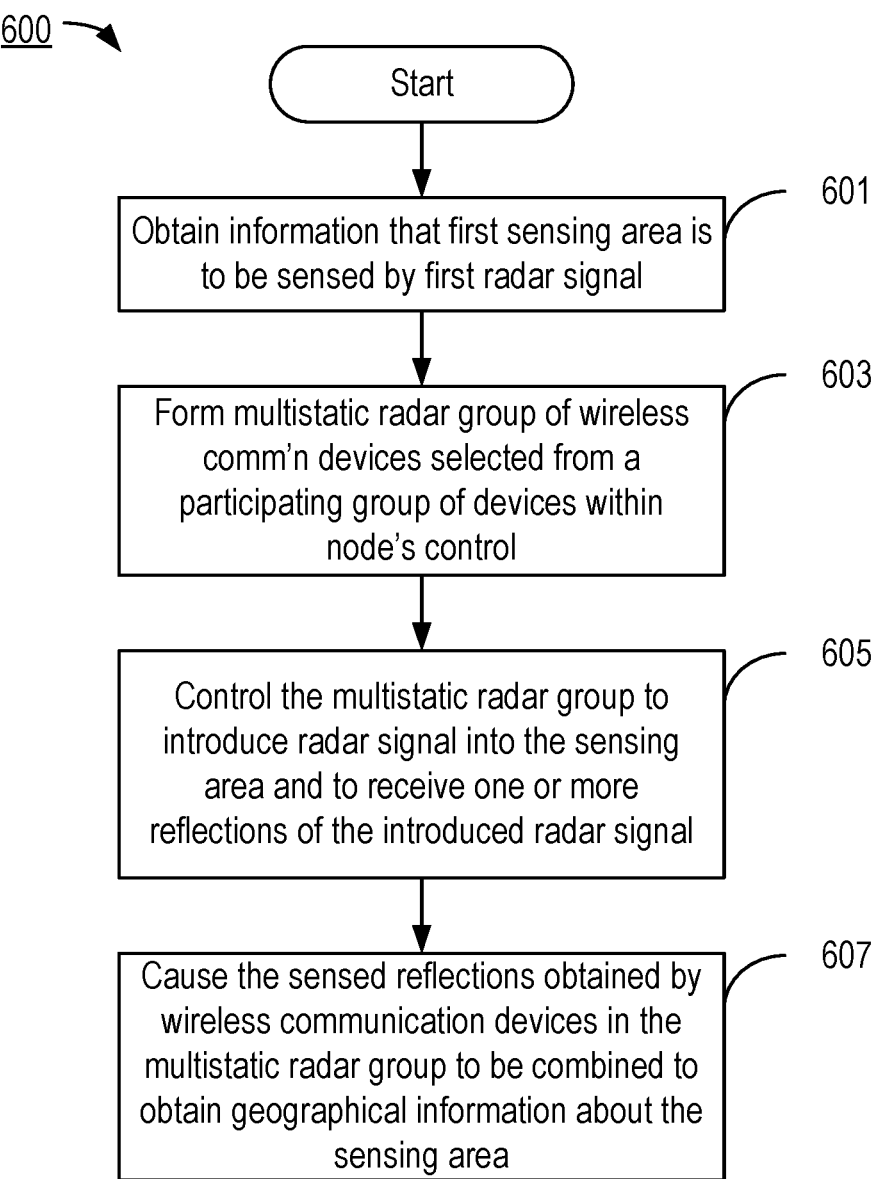
FIG. 6 is, in one respect, a flowchart of actions in accordance with exemplary embodiments corresponding to a network node that controls multistatic radar operation with respect to a sensing area lying within the cell that the node serves.

To facilitate a further understanding of aspects of embodiments consistent with the invention, reference is now made to FIG. 6, which in one respect is a flowchart of actions in accordance with exemplary embodiments corresponding to a network node 107 that controls multistatic radar operation with respect to a sensing area 111 lying within the cell that the node 107 serves. In another respect, the blocks depicted in FIG. 6 can also be considered to represent means 600 (e.g., hardwired or programmable circuitry or other processing means) for carrying out the described actions.

The node 107 controls a plurality of wireless communication devices in a wireless communication system and coordinates multistatic radar measurements. This involves obtaining (601) an indication that a first sensing area 111 located within a geographic area that is served by the node is to be sensed by a first radar signal.

The node then forms (step 603) a multistatic radar group of wireless communication devices selected from a participating group of the plurality of wireless communication devices and the node, wherein the first multistatic radar group comprises at least one device for transmitting the first radar signal and at least two devices for receiving one or more reflections of the transmitted first radar signal. As used here, the term "participating" refers to those wireless devices under the node's control that are at least on the radar interest list as described earlier. For example, the node 107 may control some number of devices that are not capable of engaging in radar activity, and therefore would neither be entered onto the radar interest list nor be considered to be among a "participating" group of devices.

The node 107 then controls the multistatic radar group to introduce (step 605) the radar signal into the sensing area 111 and to receive the one or more reflections of the introduced first radar signal. The term "introduce" is used broadly here in recognition that a transmitting device need not, itself, be within the sensing area 111—it is sufficient if it can transmit, from outside the sensing area 111, a radar signal that enters the sensing area 111.

The node 107 then causes (step 607) sensed reflections obtained by wireless communication devices in the multistatic radar group to be combined to obtain geographical information about the sensing area 111. This "combining" can be performed in a number of different ways. For example, the node 107 may collect all of the sensed reflection information and itself perform the processing to combine them into the geographical information about the sensing area 111. Alternatively, the node 107 can collect the sensed reflection information and then provide it to another entity (e.g., a server within the wireless communication network, or one of the wireless devices in the multistatic radar group) to perform the processing. In a third possibility, the node 107 does not collect the sensed reflection information itself, but instead causes each receiving radar device to directly communicate its sensed radar information to one of the devices within the multistatic radar group, which device then performs the processing.

Figure 7:
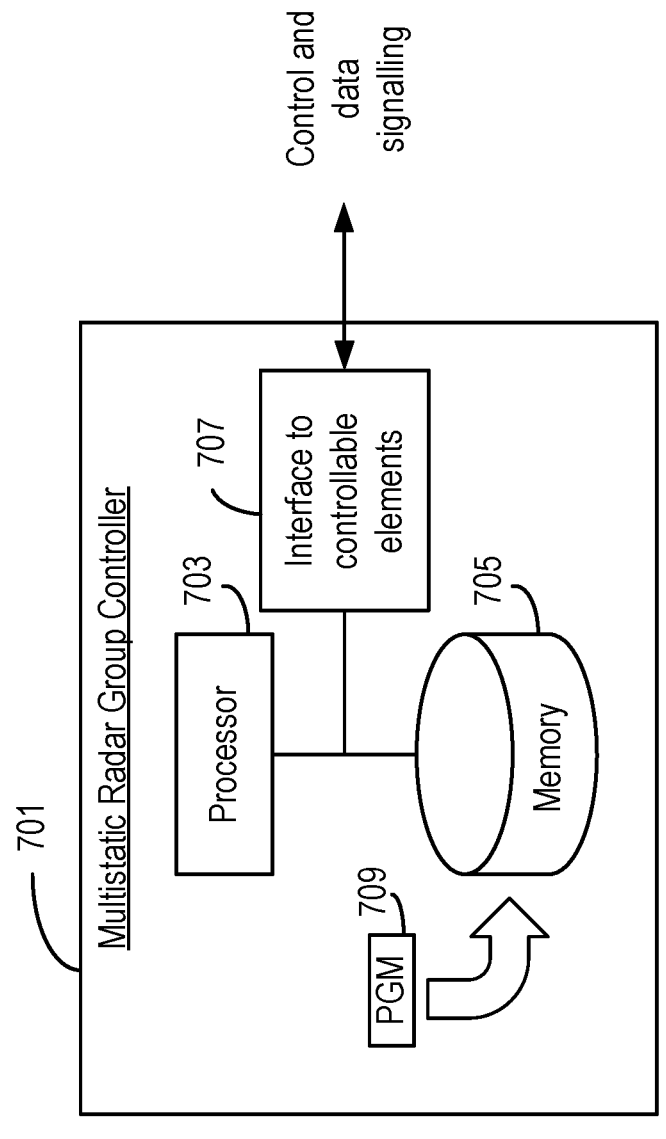
FIG. 7 illustrates an exemplary controller in accordance with some but not necessarily all exemplary embodiments consistent with the invention.

Aspects of an exemplary controller that may be employed to cause any and/or all of the above-described actions to be performed as discussed in the various embodiments is shown in FIG. 7, which illustrates an exemplary controller 701 in accordance with some but not necessarily all exemplary embodiments consistent with the invention. In particular, the controller 701 includes circuitry configured to carry out any one or any combination of the various functions described above (e.g., as illustrated in any one or more of FIGS. 2, 3, 4, 5A-5C, and 6). Such circuitry could, for example, be entirely hard-wired circuitry (e.g., one or more Application Specific Integrated Circuits—"ASICs"). Depicted in the exemplary embodiment of FIG. 7, however, is programmable circuitry, comprising a processor 703 coupled to one or more memory devices 705 (e.g., Random Access Memory, Magnetic Disc Drives, Optical Disk Drives, Read Only Memory, etc.) and to an interface 707 that enables bidirectional communication with other controllable elements of a communication device or a network node. The memory device(s) 705 store program means 709 (e.g., a set of processor instructions) configured to cause the processor 703 to control other system elements so as to carry out any of the aspects described above. The memory device(s) 705 may also store data (not shown) representing various constant and variable parameters as may be needed by the processor 703 and/or as may be generated when carrying out its functions such as those specified by the program means 709.

It will be appreciated from the above description and accompanying figures that the technology adopts an approach in which a network node (e.g., base station 107) coordinates multiple surrounding devices to form one or more multistatic radar groups. The devices inform the network node about their capabilities. The network node assigns and unassigns the devices to form or remove multistatic radar groups based on device capabilities and radar application requirements. If a device does not fit in the planned groups, it moves to a waiting list and may be given a possibility to perform monostatic measurements or bistatic if suitable based on its capability.

If a device faces a low battery situation, or is involved in critical communication (e.g., Ultra-Reliable Low-Latency Communications (URLLC), and cannot spend resources on radar activities due to these or other reasons, it can update the network node about its capabilities so that its group status is analyzed accordingly. The network node can change the assignment to a group based on such status change. In addition, if a device moves out of the cell, group area of interest, or no longer needs radar information, it will be unassigned from the group.

After forming the groups, the network node instructs the devices when to transmit and receive the radar pulses and to send the received information back to the network node (or elsewhere). The network node (or other entity) then extracts the radar-related information needed by the devices and sends it to the devices requiring the information. The radar measurements may be taken more frequently when devices and/or objects are moving. In some areas measurements may be taken more often than in others.

The technology described herein makes available a new radar solution in which a network node coordinates multiple multistatic radar operations by dynamically allocating devices to or removing them from the multistatic radar groups based on device capabilities and radar application requirements. This provides advantages over conventional technology, including but not limited to:

Little or no modifications to the mmWave communication modem are required

Long range when cooperating with adjacent devices

Capable of providing radar functionality without requiring a dedicated radar chip in the communication devices Provides additional information not obtainable by monostatic radar operation by providing illumination from different directions Network node (base station) coordinates devices to avoid interference between devices A device can be either part of the group or not depending on its particular characteristics, such as its needs, position or other characteristics, its current state of battery charge, or whether it is fully occupied by other critical operations or data transfers.

The invention has been described with reference to particular embodiments. However, it will be readily apparent to those skilled in the art that it is possible to embody the invention in specific forms other than those of the embodiment described above. Thus, the described embodiments are merely illustrative and should not be considered restrictive in any way. The scope of the invention is further illustrated by the appended claims, rather than only by the preceding description, and all variations and equivalents which fall within the range of the claims are intended to be embraced therein.

The invention claimed is:

1. A method, performed by a network node in a wireless communication system, of coordinating multistatic radar measurements, the network node controlling a plurality of wireless communication devices, the method comprising:

obtaining, from a wireless communication device, a request for radar functionality, the request representing an indication that a first sensing area located within a geographic area that is served by the network node is to be sensed by a first radar signal, the network node corresponding to a base station;

forming a first multistatic radar group of wireless communication devices selected from a participating group of the plurality of wireless communication devices and the network node, the first multistatic radar group comprising at least one wireless communication device for transmitting the first radar signal and at least two wireless communication devices for receiving one or more reflections of the transmitted first radar signal, the participating group including wireless communication devices with radar functionality;

controlling, based on the radar functionality, the first multistatic radar group to transmit the first radar signal into the first sensing area and to receive the one or more reflections of the introduced first radar signal; and causing sensed reflections obtained by wireless communication devices in the first multistatic radar group to be combined to obtain geographical information about the first sensing area.

2. The method of claim 1, wherein forming the first multistatic radar group of wireless communication devices comprises making device selections based on whether a wireless communication device under consideration is capable of performing one or more radar functions.

3. The method of claim 1, wherein forming the first multistatic radar group of wireless communication devices comprises making device selections based on whether a wireless communication device under consideration is being used for other communications.

4. The method of claim 1, wherein forming the first multistatic radar group of wireless communication devices comprises making device selections based on whether a wireless communication device under consideration is located in the first sensing area.

5. The method of claim 1, wherein forming the first multistatic radar group of wireless communication devices comprises making device selections based on whether a wireless communication device under consideration has a line-of-sight channel between the wireless communication device under consideration and one or more other wireless communication devices.

6. The method of claim 1, wherein forming the first multistatic radar group of wireless communication devices comprises making device selections based on whether a wireless communication device under consideration has communicated to the network node an indication of availability to perform one or more radar functions.

7. The method of claim 1, wherein forming the first multistatic radar group of wireless communication devices comprises making device selections based on whether transmission of the first radar signal by a wireless communication device under consideration will disturb one or more other communication activities being carried out by one or more of the plurality of wireless communication devices.

8. The method of claim 1, comprising:

obtaining information that a member of the first multistatic radar group has changed position, and in response deciding whether to remove the member from the first multistatic radar group based on one or more consequences of the changed position of the member of the first multistatic radar group.

9. The method of claim 8, further comprising assessing whether the first multistatic radar group can continue to perform radar sensing of the first sensing area without participation of the member of the first multistatic radar group that has changed position.

10. The method of claim 1, comprising:

obtaining an indication that a second sensing area located within the geographic area that is served by the network node is to be sensed by a second radar signal; and forming a second multistatic radar group of wireless communication devices selected from the participating group of the plurality of wireless communication devices and the network node, wherein the second multistatic radar group comprises at least one device for transmitting the second radar signal and at least two devices for receiving one or more reflections of the transmitted second radar signal.

11. The method of claim 1, wherein causing sensed reflections obtained by wireless communication devices in the first multistatic radar group to be combined to obtain geographical information about the first sensing area comprises:

collecting sensed radar information from members of the first multistatic radar group and supplying the collected sensed radar information to one or more of the wireless communication devices.

12. The method of claim 1, wherein the indication that the first sensing area located within the geographic area that is served by the network node is to be sensed by the first radar signal is a request for radar functionality that is received from a requesting one of the wireless communication devices.

13. The method of claim 12, wherein the first multistatic radar group is one of a group of one or more existing multistatic radar groups, and wherein the method further comprises:

receiving a second request for radar functionality from a second requesting one of the wireless communication devices; and determining whether the second requesting one of the wireless communication devices is suitable for inclusion in one of the one or more existing multistatic radar groups, and if so then adding the second requesting one of the wireless communication devices to the one of the one or more existing multistatic radar groups.

14. The method of claim 13, comprising:

if the second requesting one of the wireless communication devices is not suitable for inclusion in one of the one or more existing multistatic radar groups, then determining whether a new multistatic radar group can be formed to perform the second requested radar functionality and if so, then forming the new multistatic radar group.

15. The method of claim 13, comprising:

if the second requesting one of the wireless communication devices is not suitable for inclusion in one of the one or more existing multistatic radar groups and a new multistatic radar group cannot be formed to perform the second requested radar functionality, then adding the second requesting one of the wireless communication devices to a waiting list for future radar functionality servicing.

16. The method of claim 1, comprising:

receiving a request from one of the plurality of wireless communication devices to withdraw from the first multistatic radar group, and in response thereto:

removing the requesting one of the plurality of wireless communication devices from the first multistatic radar group; and assessing whether the first multistatic radar group can continue to perform radar sensing of the first sensing area without participation of the one of the wireless communication devices that requested withdrawal from the multistatic radar group.

17. A non-transitory computer readable storage medium comprising instructions that, when executed by at least one processor, causes the at least one processor to carry out a method of a network node in a wireless communication system, of coordinating multistatic radar measurements, wherein the network node controls a plurality of wireless communication devices, the method comprising:

obtaining, from a wireless communication device, a request for radar functionality, the request representing an indication that a first sensing area located within a geographic area that is served by the network node is to be sensed by a first radar signal, the network node corresponding to a base station;

forming a first multistatic radar group of wireless communication devices selected from a participating group of the plurality of wireless communication devices and the network node, wherein the first multistatic radar group comprises at least one wireless communication device for transmitting the first radar signal and at least two wireless communication devices for receiving one or more reflections of the transmitted first radar signal, the participating group including wireless communication devices with radar functionality;

controlling, based on the radar functionality, the first multistatic radar group to transmit the first radar signal into the first sensing area and to receive the one or more reflections of the introduced first radar signal; and causing sensed reflections obtained by wireless communication devices in the first multistatic radar group to be combined to obtain geographical information about the first sensing area.

18. A network node in a wireless communication system configured to coordinate multistatic radar measurements, the network node configured to control a plurality of wireless communication devices, the network node comprising:

circuitry configured to obtain, from a wireless communication device, a request for radar functionality, the request representing an indication that a first sensing area located within a geographic area that is served by the network node is to be sensed by a first radar signal, the network node corresponding to a base station;

circuitry configured to form a first multistatic radar group of wireless communication devices selected from a participating group of the plurality of wireless communication devices and the network node, wherein the first multistatic radar group comprises at least one wireless communication device for transmitting the first radar signal and at least two wireless communication devices for receiving one or more reflections of the transmitted first radar signal, the participating group including wireless communication devices with radar functionality;

circuitry configured to control, based on the radar functionality, the first multistatic radar group to transmit the first radar signal into the first sensing area and to receive the one or more reflections of the introduced first radar signal; and circuitry configured to cause sensed reflections obtained by wireless communication devices in the first multistatic radar group to be combined to obtain geographical information about the first sensing area.

19. The network node of claim 18, wherein the circuitry configured to form the first multistatic radar group of wireless communication devices comprises circuitry configured to make device selections based on whether a wireless communication device under consideration is capable of performing one or more radar functions.

20. The network node of claim 18, wherein the circuitry configured to form the first multistatic radar group of wireless communication devices comprises circuitry configured to make device selections based on whether a wireless communication device under consideration is being used for other communications.

21. The network node of claim 18, wherein the circuitry configured to form the first multistatic radar group of wireless communication devices comprises circuitry configured to make device selections based on whether a wireless communication device under consideration is located in the first sensing area.

22. The network node of claim 18, wherein the circuitry configured to form the first multistatic radar group of wireless communication devices comprises circuitry configured to make device selections based on whether a wireless communication device under consideration has a line-of-sight channel between the wireless communication device under consideration and one or more other wireless communication devices.

23. The network node of claim 18, wherein the circuitry configured to form the first multistatic radar group of wireless communication devices comprises circuitry configured to make device selections based on whether a wireless communication device under consideration has communicated to the node an indication of availability to perform one or more radar functions.

24. The network node of claim 18, wherein the circuitry configured to form the first multistatic radar group of wireless communication devices comprises circuitry configured to make device selections based on whether transmission of the first radar signal by a wireless communication device under consideration will disturb one or more other communication activities being carried out by one or more of the plurality of wireless communication devices.

25. The network node of claim 18, comprising:
circuitry configured to obtain information that a member of the first multistatic radar group has changed position, and in response deciding whether to remove the member from the first multistatic radar group based on one or more consequences of the changed position of the member of the first multistatic radar group.

26. The network node of claim 25, further comprising circuitry configured to assess whether the first multistatic radar group can continue to perform radar sensing of the first sensing area without participation of the member of the first multistatic radar group that has changed position.

27. The network node of claim 18, comprising:
circuitry configured to obtain an indication that a second sensing area located within the geographic area that is served by the node is to be sensed by a second radar signal; and
circuitry configured to form a second multistatic radar group of wireless communication devices selected from the participating group of the plurality of wireless communication devices and the node, wherein the second multistatic radar group comprises at least one device for transmitting the second radar signal and at least two devices for receiving one or more reflections of the transmitted second radar signal.

28. The network node of claim 18, wherein the circuitry configured to cause sensed reflections obtained by wireless communication devices in the first multistatic radar group to be combined to obtain geographical information about the first sensing area comprises:

circuitry configured to collect sensed radar information from members of the first multistatic radar group and to supply the collected sensed radar information to one or more of the wireless communication devices.

29. The network node of claim 18, wherein the indication that the first sensing area located within the geographic area that is served by the node is to be sensed by the first radar signal is a request for radar functionality that is received from a requesting one of the wireless communication devices.

30. The network node of claim 29, wherein the first multistatic radar group is one of a group of one or more existing multistatic radar groups, and wherein the node further comprises:
circuitry configured to receive a second request for radar functionality from a second requesting one of the wireless communication devices; and
circuitry configured to determine whether the second requesting one of the wireless communication devices is suitable for inclusion in one of the one or more existing multistatic radar groups, and if so then adding the second requesting one of the wireless communication devices to the one of the one or more existing multistatic radar groups.

31. The network node of claim 30, comprising:
circuitry configured to operate in response to the second requesting one of the wireless communication devices not being suitable for inclusion in one of the one or more existing multistatic radar groups by determining whether a new multistatic radar group can be formed to perform the second requested radar functionality and if so, then to form the new multistatic radar group.

32. The network node of claim 30, comprising:
circuitry configured to operate in response to the second requesting one of the wireless communication devices not being suitable for inclusion in one of the one or more existing multistatic radar groups and a new multistatic radar group not being able to be formed to perform the second requested radar functionality by adding the second requesting one of the wireless communication devices to a waiting list for future radar functionality servicing.

33. The network node of claim 18, comprising:
circuitry configured to receive a request from one of the plurality of wireless communication devices to withdraw from the first multistatic radar group, and in response thereto:
to remove the requesting one of the plurality of wireless communication devices from the first multistatic radar group; and
assess whether the first multistatic radar group can continue to perform radar sensing of the first sensing area without participation of the one of the wireless communication devices that requested withdrawal from the multistatic radar group.

* * * * *